Jan. 30, 1962 T. R. NISBET 3,019,345

RADIATION AMPLIFIER

Filed Dec. 3, 1959 2 Sheets-Sheet 1

INVENTOR.
THOMAS R. NISBET
BY George C. Sullivan
Agent

INVENTOR.
THOMAS R. NISBET
BY George C. Sullivan
Agent

United States Patent Office 3,019,345

Patented Jan. 30, 1962

3,019,345

RADIATION AMPLIFIER

Thomas R. Nisbet, Palo Alto, Calif., assignor to Lockheed Aircraft Corporation, Burbank, Calif.

Filed Dec. 3, 1959, Ser. No. 857,022

4 Claims. (Cl. 250—213)

This invention relates generally to radiation amplifiers, and more particularly to radiation amplifiers employing electroluminescent and photoconductive elements.

The basic type of electroluminescent radiation amplifier which has heretofore been used comprises an electroluminescent element, a photoconductive element electrically connected in series therewith, and an A.-C. energizing voltage connected across this series combination. Usually, some degree of optical coupling is provided between these two elements.

In the absence of incident radiation on the photoconductive element, the high dark impedance thereof prevents the A.-C. energizing voltage from causing luminescence of the electroluminescent element. As the photoconductive element is illuminated by incident radiation, its impedance reduces, thereby increasing the voltage across the electroluminescent element so as to produce a corresponding increase in the light output thereof. For a given change in the intensity of the incident radiation, a predetermined change in the light output of the electroluminescent element is obtained. If the ratio of the change in light output to the change in incident radiation is greater than one, amplification results.

One way which has been used to increase the resulting amplification has been to provide regenerative action in the amplifier by increasing the optical coupling between the electroluminescent and photoconductive elements to a significant extent. Thus, if the incident radiation is increased, producing a decrease in the impedance of the photoconductive element in response thereto, the resultant increase in the light output of the electroluminescent element will act to further illuminate the photoconductive element because of the optical coupling therebetween. If this further illumination is significant, the regenerative action thereby produced will make possible a much greater radiation amplification.

The above described type of regenerative operation is similar to that which may be employed with most amplifiers, and as is the case with these amplifiers, regeneration can satisfactorily be used to increase the amplification obtained only up to a critical point (determined by circuit characteristics) beyond which bistable or oscillatory operation is produced. In the case of the electroluminescent radiation amplifier just described, regeneration beyond this critical point produces bistable operation.

Theoretically, regeneration can be increased up to the critical point so as to provide a large amplification. However, this is not possible in an electroluminescent radiation amplifier because of the non-linear characteristic of its light output vs. voltage curve. The result, therefore is that the amount of radiation amplification which has heretofore been obtainable from an electroluminescent radiation amplifier has been quite limited both as to magnitude and the range of incident radiation which can be amplified.

Another approach towards improving the amplification of a radiation amplifier involves providing a unidirectional energizing voltage for the photoconductive element because of its greater sensitivity to unidirectional fields, as is described in Patent No. 2,839,690. Although a significant improvement in amplification is obtained, the limited amount of regeneration which can be employed as previously explained, continues to limit the amplification which would otherwise be obtainable.

It is the broad object of this invention, therefore, to provide an electroluminescent radiation amplifier having a very much greater amplification than has heretofore been possible over a wide range of incident radiation.

A more specific object of this invention is to provide novel energizing means in combination with an electroluminescent and photoconductive element construction, whereby a greatly increased radiation amplification is achieved over a wide range of incident radiation.

Another object of this invention is to provide an image intensifier, comprising electroluminescent and photoconductive elements and a novel energizing means, which is capable of producing a highly amplified electroluminescent image in response to an incident radiation image applied thereto.

An additional object of this invention is to provide an image intensifier comprising electroluminescent and photoconductive elements and a novel energizing means, in which the electroluminescent image can be retained indefinitely after the incident radiation image has been removed.

Still another object of this invention is to provide a method for energizing an optically coupled electroluminescent and photoconductive element construction so as to permit operation beyond the threshold of bistability, thereby achieving greatly increased radiation amplification over a wide range of incident radiation.

In a typical embodiment of the invention an image intensifier is provided comprising a laminated construction in which contiguous laminae of electroluminescent and photoconductive material are interposed between transparent lamina electrodes and energized by an amplitude modulated A.-C. voltage source having predetermined "on" and "off" times, and a predetermined wave shape. It has been found that by initially adjusting the electroluminescent and photoconductive combination for bistable operation, and properly choosing the characteristics of the amplitude modulation of the A.-C. energizing source, amplifier operation may be obtained beyond the threshold of bistability, making possible an amazingly high radiation amplification over a wide range of incident radiation. The specific nature of the invention, as well as other objects, uses, and advantages thereof, will clearly appear from the following description and from the accompanying drawing in which:

Like numerals designate like elements throughout the figures of the drawing.

Figure 1:
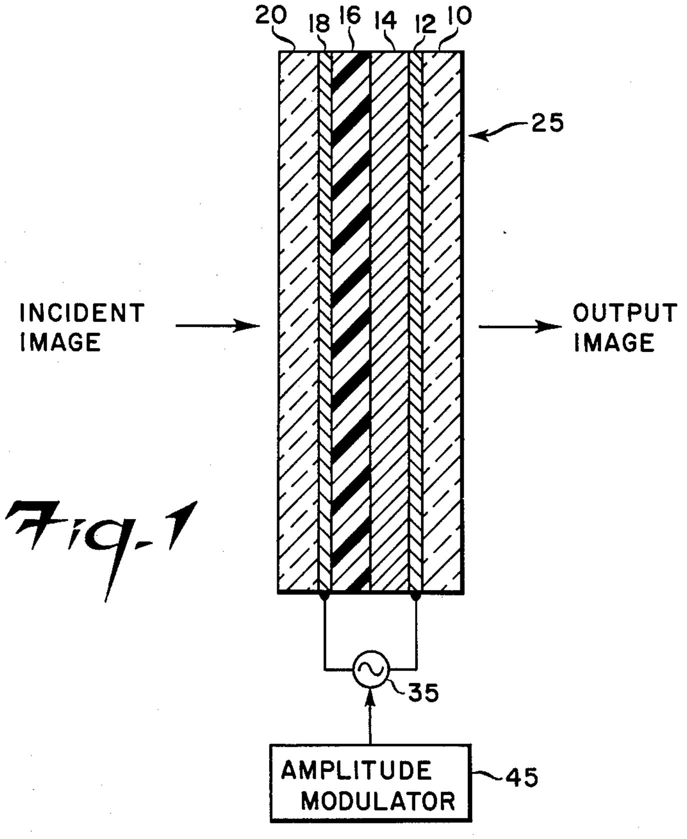
FIGURE 1 is a diagrammatic and cross-sectional view of an image intensifier in accordance with the invention.

In FIGURE 1, a basic form of laminated electroluminescent and photoconductive element construction 25 is shown which is similar to those previously employed in the art (see, for example, Patent Nos. 2,768,310; 2,773,-992; 2,837,661 and 2,875,350). This construction 25 comprises a layer of electroluminescent material 14, a contiguous layer of photoconductive material 16 and transparent electrodes 12 and 18 between which the photoconductive and the electroluminescent layers 14 and 16 are interposed. The electrodes 12 and 18 may suitably be deposited on glass laminations 10 and 20 as shown in FIGURE 1. The photoconductive material 16 may be cadmium sulfide and the electroluminescent material 14 may be a copper activated zinc oxide and zinc sulphide mixture.

The present state of the art is such that a construction in accordance with that shown by 25 in FIGURE 1 can readily be provided with a wide range of operating characteristics. Since the novelty of the present invention does not reside in the particular construction 25, further details thereof will not be given. It is to be understood, therefore, that the particular construction 25 is shown merely for exemplary purposes and many variations and modifications thereof are possible. Some of these are shown in the aforementioned patents.

The construction 25 has heretofore been employed for use as an image intensifier by applying a suitable A.-C. energizing voltage between the transparent electrodes 12 and 18. In order to provide background information which will permit a better understanding of the invention, the operation of the known image intensifier will now be explained. The construction 25 is designed in conjunction with the magnitude of the A.-C. energizing voltage, so that with no incident radiation, there is substantially no light output from the electroluminescent layer 14. When an incident image is applied, the impedance of each elemental portion of the photoconductive layer 16 changes in accordance with the radiation intensity incident thereon. Since corresponding elemental portions of the electroluminescent and photoconductive layers 14 and 16 are effectively in series with the applied energizing voltage, a resultant electroluminescent output image is obtained corresponding to the incident image. The brightness of the output image will depend upon the amplification of the system.

Because of the contiguous relationship between the electroluminescent and photoconductive layers 14 and 16, some optical coupling is present, but in order to obtain amplifier operation, it has heretofore been the practice to choose the applied A.-C. energizing voltage and the construction 25 so that regenerative action would not produce bistable operation.

The chief feature of the present invention, which makes possible a very much greater radiation amplification over a wide range of incident radiation, is that amplifier operation is provided in the region of bistability. In accordance with the present invention the construction 25 of FIGURE 1 is designed in conjunction with the energizing A.-C. voltage from the source 35, so that in the presence of the lowest level of incident radiation which it is designed to amplify, the circuit becomes bistable. That is, if this lowest level of incident radiation is applied to all portions of the photoconductive material 16, the electroluminescent material will regeneratively build up in brightness to produce an output image with all portions having a light output of some high value, dependent upon circuit characteristics. The level of brightness attained by an electroluminescent element in a bistable circuit is known as its saturation value. Thus, for all incident radiation which is greater than this lowest level, an output image of substantially constant brightness throughout will be obtained, regardless of the magnitude of the incident radiation. It will be understood that the techniques and knowledge now available in the art make it possible to readily provide a construction, such as 25, which will have sufficient optical coupling between the electroluminescent and photoconductive layers 14 and 16 to achieve bistable operation.

Figure 2:
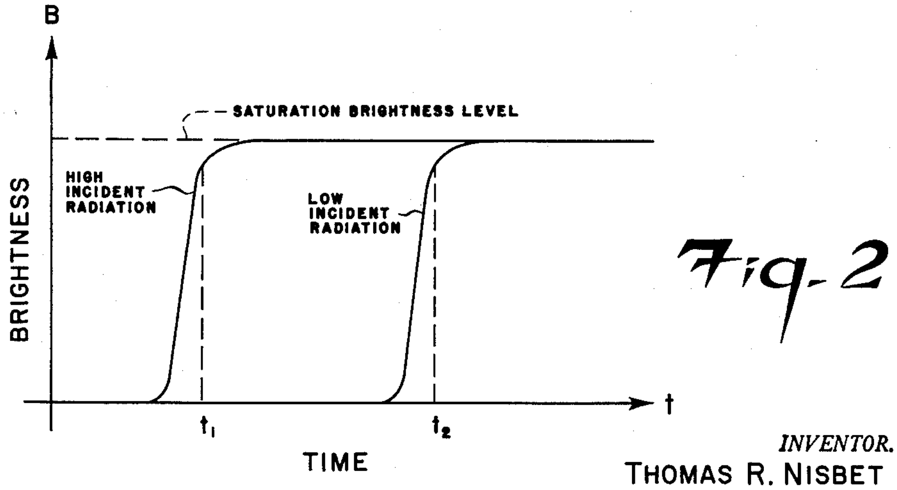
FIGURE 2 is a graph of Brightness vs. Time for low and high incident radiations applied to the embodiment of FIGURE 1.

If the construction 25 of FIGURE 1 is now considered to be designed in conjunction with the applied A.-C. voltage from the source 35, so that bistable operation is obtained for the smallest incident radiation which it is desired to amplify, brightness vs. time curves may then be drawn for various levels of incident radiation, as shown in the graph of FIGURE 2. In this graph, the time taken for the brightness of the electroluminescent material 14 to reach its bistable saturation level can be seen to be dependent upon the level of incident radiation. Two illustrative curves are shown for high and low levels of incident radiation. For high incident radiation, it is seen that a relatively small time $t_1$ is required for the electroluminescent material to reach its saturation brightness level, while for a low level of incident radiation a substantially greater time $t_2$ is required. The time required for an elemental portion of the electroluminescent layer 14 to reach its saturation brightness level is therefore directly dependent on the level of incident radiation on the corresponding elemental portion of the photoconductive layer 16 in series therewith.

Keeping in mind the curves of FIGURE 2 the operation of the radiation amplifier shown in FIGURE 1 may now be explained. Instead of applying a continuous A.-C. energizing voltage to the construction 25, an amplitude modulator 45 is provided to permit the voltage output of the A.-C. voltage source 35 to be amplitude modulated. Means for amplitude modulating the output of an A.-C. voltage source are quite well known in the art and may be provided in a variety of forms. The block designation of the amplitude modulator 45 in FIGURE 1 merely represents any of the many types of amplitude modulators that may satisfactorily be used in accordance with this invention.

Figures 3, 4:
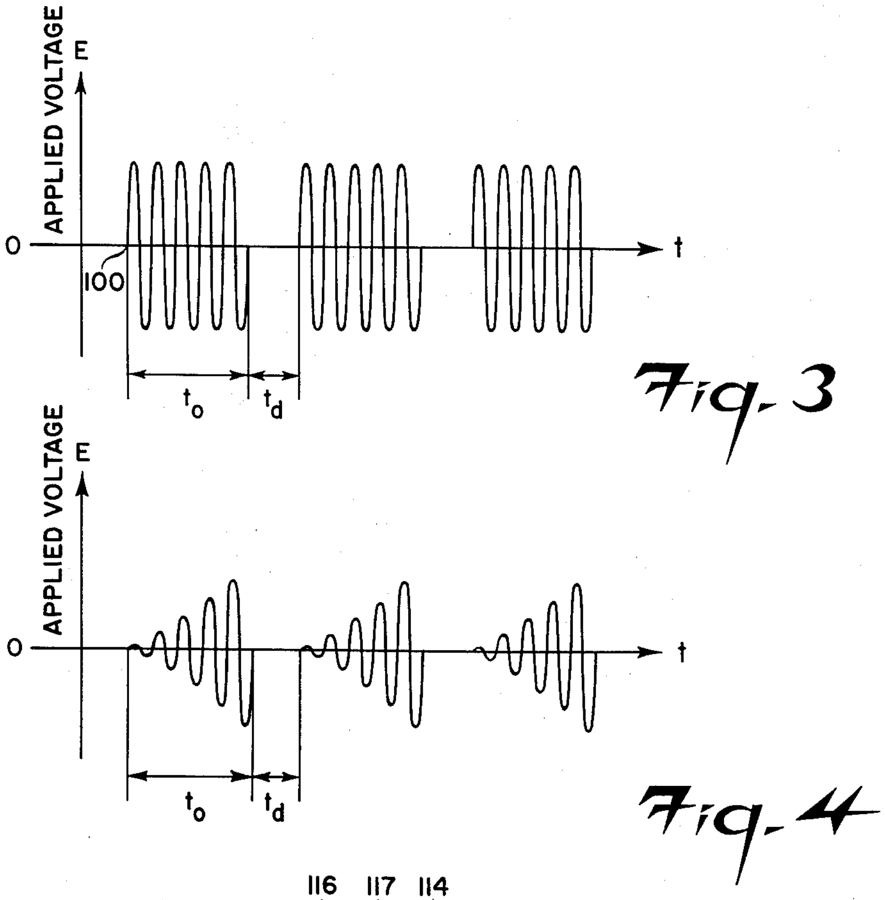
FIGURE 3 is a graph of one type of energization voltage pulses which may advantageously be employed, in accordance with this invention.
FIGURE 4 is a graph showing another form of energizing voltage pulses which may advantageously be employed in the embodiment of FIGURE 1.

FIGURE 3 illustrates the basic type of amplitude modulation of the output of the A.-C. voltage source 35 which is advantageously employed in the embodiment of FIGURE 1. The amplitude modulator 45 is adapted to modulate the source 35, so that for a predetermined "on" time $t_0$, the voltage output of the source 35 is at a value which would cause the electroluminescent layer 14 to build up to its saturation brightness level for the lowest incident radiation level to be amplified, and for a predetermined "off" time $t_d$, the output voltage is at zero or a value which would cause the electroluminescent layer 14 to be dark. The "on" time $t_0$ is most advantageously chosen approximately equal to the time that it takes an elemental electroluminescent portion to reach its saturation brightness level when its corresponding elemental photoconductive portion in series therewith is illuminated by the lowest radiation it is desired to amplify. If the low incident radiation curve of FIGURE 2 were the lowest incident radiation it was desired to amplify, the time $t_0$ would then preferably be made approximately equal to $t_2$. The "off" time of the applied voltage from the source 35 (for which the voltage is either zero or below the value which would cause luminescence of the electroluminescent layer 14 for the range of incident radiation levels to be amplified) is most advantageously chosen approximately equal to the non-regenerative decay time of an elemental electroluminescent and photoconductive circuit whose elemental electroluminescent portion is at the saturation brightness level; that is, the non-regenerative decay time is the time required, when the energization voltage is "off" and there is no incident radiation, for an elemental electroluminescent portion to become substantially dark from the saturation brightness level and for the corresponding elemental photoconductive portion to return to its substantially dark impedance value. Since most electroluminescent materials have a negligible response time, this non-regenerative decay time will ordinarily be determined by the response time of the photoconductive material.

The operation of the embodiment of FIGURE 1 will now be understood as follows. An incident image illuminates the photoconductive layer 16 through the glass lamination 20 and the transparent electrode 18. For the purposes of the operative description it will be assumed that the "on" time of the A.-C. energizing voltage has just begun as indicated at 100 in FIGURE 3. For each elemental photoconductive portion which receives incident radiation greater than the minimum level which it is desired to amplify, a corresponding elemental electroluminescent portion in series therewith will then begin to build up to the saturation brightness level at a rate determined by the level of incident radiation. Also, for each elemental photoconductive portion which receives incident radiation less than the minimum level which it is desired to amplify, the corresponding electroluminescent elemental portion will remain dark. If the energizing voltage were not modulated and remained indefinitely, the electroluminescent layer 14 would shortly produce a silhouette-type output image in which elemental portions would either be dark or at the saturation brightness level.

In accordance with the present invention, however, the A.-C. energizing voltage is only present for the time $t_0$ required for an elemental electroluminescent portion, whose corresponding elemental photoconductive portion is illuminated by the lowest incident radiation to be amplified, to build up to its saturation level. Thus, the greater the incident radiation on an elemental photoconductive portion, the longer that the corresponding elemental electroluminescent portion will remain at its saturation brightness level during the time $t_0$ that the energizing A.-C. voltage is applied.

During the "off" time $t_d$ when no energizing A.-C. voltage is applied, the circuit decays so that all portions of the electroluminescent layer 14 are again dark. When the "on" time of the energizing voltage begins again, therefore, the cycle repeats its operation as just described, and continues to do so in accordance with the periodicity of the modulation applied to the energizing voltage.

It will now become evident that except for dark elemental portions corresponding to incident radiation below the level it is desired to amplify, elemental portions of the electroluminescent layer 14 will have an average brightness directly proportional to the level of incident radiation applied to corresponding photoconductive elemental portions. Since build-up and decay take place very rapidly, the times $t_0$ and $t_d$ are relatively short, so that flicker resulting from pulsing the energizing voltage will not be perceptible by the human eye.

The result is that the electroluminescent layer 14 will produce an output image which is an amplified replica of the incident image, this output image being visible through the glass lamination 10 and the transparent electrode 12. The resulting brightness of this image will range from almost zero for low incident radiations, to a maximum average brightness for large incident radiations, corresponding to the situation where the electroluminescent elemental area is at its saturated brightness level for almost the entire time $t_0$ that the energizing A.-C. voltage is "on."

It will thus be understood that the amplification obtained by the electroluminescent radiation amplifier just described is dependent on the change in the saturation build-up time in response to changes in the incident radiation. Because of the high degree of regeneration which inherently takes place during this build-up, small changes in incident radiation (which cause corresponding changes in the photoconductive impedance) result in relatively large changes in the build-up time. The type of radiation amplifier operation provided by this invention, therefore, makes possible a very much higher amplification than is possible using the conventional radiation amplifier previously described, in which regeneration must be maintained at a relatively low value. Also, not only is amplification obtained over a much wider range of incident radiation, but in addition, a much more linear amplification curve is obtained. It has been found that a still further increase in the radiation amplification can be obtained in the embodiment of FIGURE 1 by adapting the modulator 45 to provide an exponentially rising A.-C. energization voltage as shown in the graph of FIGURE 4.

It is to be understood that the invention is not limited to the particular amplitude modulation of the energizing voltage shown in FIGURES 3 and 4. Although the modulation shown is most preferable, other types of amplitude modulation may be used which will provide amplifications significantly larger than has heretofore been possible. The important requirement is that the wave-shape of the energizing voltage and the durations of the "on" and "off" times thereof be chosen so that the modulated energizing voltage acts in cooperation with the bistable condition of the electroluminescent and photoconductive element construction to produce a condition for which a useable amplification relationship is obtained over a desired range of incident radiation levels.

It will thus be seen that the present invention makes it possible to obtain a remarkably high radiation amplification of an incident image by employing a conventional type of optically-coupled electroluminescent and photoconductive construction in a bistable arrangement which is energized by a modulated A.-C. voltage whose pulse shape and "on" and "off" times are chosen to provide a high degree of radiation amplification. As was brought out previously, a bistable optically-coupled electroluminescent and photoconductive construction, which will provide operation in accordance with this invention, may readily be provided employing techniques and skills now available in the art. Also, many of the improved construction techniques and arrangements for such a photoconductive and electroluminescent construction shown, for example, in some of the aforementioned patents may advantageously be employed if desired. However, regardless of the particular construction used, as long as operation is provided as described herein, the radiation amplification obtainable will be very much greater than would be possible if the construction were operated in the conventional manner.

It should be evident that the invention may also be employed to provide a very small radiation amplifier cell having an unusually high amplification over a wide range of incident radiation. A large number of these very small cells could then be connected in a form of a mosaic, and individually controlled, so as to permit scanning, thereby producing images in a manner similar to that of a cathode ray tube.

Figure 5:
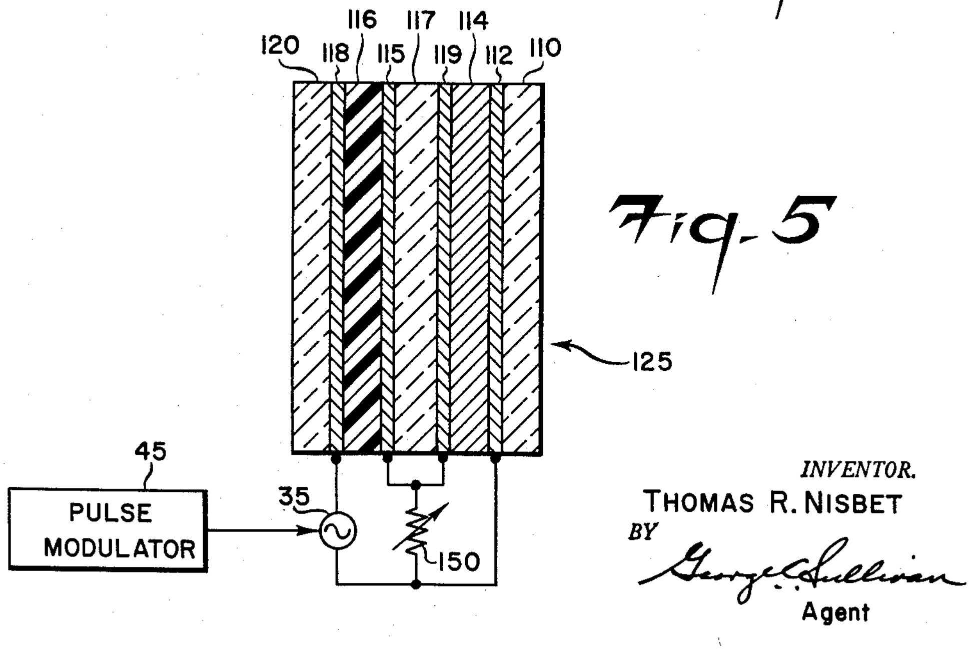
FIGURE 5 is a diagrammatic and cross-sectional view of a radiation amplifier cell, in accordance with the invention.

The construction 25 shown in FIGURE 1, if small, would satisfactorily serve as a suitable radiation amplifier. A more versatile construction, however, is shown at 125 in FIGURE 5. The numerals 120, 118, 116, 114, 112 and 110 correspond respectively to the elements 20, 18, 16, 14, 12 and 10 of the construction 25 of FIGURE 1, but these elements are made sufficiently small so as to provide a radiation amplifier cell of the desired size.

The principal change in the construction of 125 over that of 25 is in the provision of a glass lamination 117, having transparent electrodes 115 and 119 on opposite sides thereof, interposed between the electroluminescent and photoconductive layers 114 and 116. This makes it possible to readily electrically connect an adjustable resistor 150 across the photoconductive layer 114 in order to provide a degree of control for scanning or other purposes, such as control of the point at which bistable operation takes place. As was the case with the construction 25 of FIGURE 1, the construction 125 can readily be provided with the techniques and skill now available in the art. Also, the operation of the radiation amplifier cell is identical to that previously described in connection with the embodiment of FIGURE 1, except that luminescence of all portions of the electroluminescent layer 114 will have the same brightness, since the electrodes 115 and 119 place the entire electroluminescent layer 114 electrically in series with the entire photoconductive layer 116. The layers 114 and 116 thereby act as whole units, and elemental portions are not in series as was the case for the construction 25. Optical coupling between the electroluminescent and photoconductive layers 114 and 116 is obtained through the glass lamination 117 and its transparent electrodes 115 and 119.

The unique operation of this invention makes possible another important use to which it may be applied, this being as a radiation amplifier capable of retaining an incident radiation image after the incident image is removed. This may be accomplished, either in the embodiments of FIGURE 1 or 7 by choosing the "off" time of the modulated energizing voltage a predetermined amount shorter than the non-regenerative decay time of the circuit. By such a choice, each elemental electroluminescent portion (or cell when referring to the embodiment of FIGURE 7) will have only partially decayed from the brightness which it had built up to during the "on" time of the energization voltage.

The "off" time is then chosen so that for a predetermined minimum brightness to which an elemental portion has built up during the "on" time, the "off" time will be sufficiently short, so that when the "on" time of the energizing voltage returns, the elemental portion will again begin to build up towards its saturation brightness level, even though the incident radiation on its corresponding elemental photoconductive portion is removed.

It should be noted that the system will still operate to provide radiation amplification for incident images if the "off" time is not too small since elemental portions will oscillate between two brightness levels determined by the incident radiation, the average brightness thereof thereby still being proportional to the incident radiation thereon. However, the greater the reduction in the "off" time, the lower the amplification will be, and the more restrictive will be the range of incident radiation levels which can be amplified. Obviously, the "off" time can not be made so small that build-up becomes accumulative to an extent where almost all elemental portions reach the saturation brightness level, in which case they all will have approximately the same average brightness.

The advantage of choosing the "off" time less than the decay time as just described is that the electroluminescent layer will retain its output image, even after the incident image is removed. Since the incident illumination is not present, each elemental portion will not build up to as great a brightness level as it had before during the next "on" time. The level of brightness reached, however, will be dependent upon the last brightness level which was reached before the incident image was removed.

It is to be understood that many modifications and variations are possible without departing from the scope of this invention. For example, although the use of an A.-C. energizing source is illustrated, the invention could just as well be applied to a system having an appropriately modulated D.-C. energizing voltage. At present, most practical phosphors are of the type which respond to A.-C. energization only.

It is also to be understood that the invention is not limited to the amplification of light images. By choosing a photoconductive material which is sensitive both to the light emitted by the electroluminescent material and the incident radiation, various types of incident radiation may be amplified. For example, if a photoconductive material is used which is sensitive both to visible light and infra-red radiation, and an incident infra-red image is applied thereto, an amplified visible electroluminescent output image will be produced.

It will be apparent, therefore, that the embodiments shown and described herein are only exemplary, and that various modifications can be made in construction and arrangement within the scope of the invention as defined in the appended claims.

I claim as my invention:

1. A radiation amplifier cell comprising a lamina of electroluminescent material, a lamina of photoconductive material, a first glass lamination having transparent electrodes formed on opposite sides thereof interposed between and in contact with one side of each of the laminae of electroluminescent and photoconductive material, a second glass lamination having a transparent electrode formed on one side thereof and located so that the transparent electrode is adjacent and in contact with the side of said photoconductive lamina opposite from said first glass member, a third glass lamination having a transparent electrode formed on one side thereof and located so that the transparent electrode is adjacent and in contact with the side of said electroluminescent lamina opposite from said first glass member, means connecting together the transparent electrodes of said first glass lamination, an energizing voltage source connected between the transparent electrodes of said second and third glass laminations, said electroluminescent and photoconductive laminae and the optical coupling therebetween as a result of light passing through said first glass lamination and its transparent electrodes being constructed and arranged in conjunction with the voltage output of said source so that bistable operation is obtained for incident radiation on said photoconductive lamina above a predetermined minimum level, and modulating means modulating the output voltage of said source so that for a first predetermined time the voltage of said source has a magnitude which causes the electroluminescent lamina to build up towards its saturation brightness level for incident radiation on said photoconductive element above said predetermined minimum level, and for a second predetermined time has a magnitude which causes the electroluminescent lamina to become substantially dark, said first predetermined time being chosen substantially equal to the time taken for said electroluminescent lamina to build up to its saturation brightness level when said photoconductive element is illuminated by said predetermined minimum level of incident radiation, and said second predetermined time being chosen substantially equal to the non-regenerative decay time of the electroluminescent and photoconductive circuit.

2. An image intensifier comprising contiguous laminae of electroluminescent and photoconductive material, first and second glass laminations between which said contiguous laminae are interposed, first and second transparent electrodes formed on one side of said first and second glass laminations so that corresponding elemental areas of said contiguous laminae are electrically in series with said electrodes, an energizing voltage source connected between said transparent electrodes, said contiguous laminae and the optical coupling therebetween being constructed and arranged in conjunction with the voltage output from said source so that bistable operation is obtained for incident radiation on said photoconductive element above a predetermined minimum level, and modulating means modulating the output voltage of said source so that for a first predetermined time the voltage of said source has a magnitude which causes each elemental electroluminescent portion to build up towards its saturation brightness for incident radiation on its corresponding elemental photoconductive portion above said predetermined minimum level, and for a second predetermined time which causes each elemental electroluminescent portion to become substantially dark, said first predetermined time being chosen substantially equal to the time taken for said electroluminescent element to build up to its saturation brightness level when said photoconductive element is illuminated by said predetermined level of incident radiation, and said second predetermined time being chosen substantially equal to the non-regenerative decay time of the electroluminescent and photoconductive circuit.

3. The invention in accordance with claim 2, wherein said modulating means are adapted so that the output voltage from said source has an exponentially rising characteristic during said first predetermined time.

4. A radiation amplifier capable of retaining an incident radiation image after the incident image is removed comprising contiquous laminae of electroluminescent and photoconductive material, first and second glass laminations between which said contiguous laminae are interposed, first and second transparent electrodes formed on one side of said first and second glass laminations so that corresponding elemental areas of said contiguous laminae are electrically in series with said electrodes, an energizing voltage source connected between said transparent electrodes, said contiguous laminae and the optical coupling therebetween being constructed and arranged in conjunction with the voltage output from said source so that bistable operation is obtained for incident radiation on said photoconductive element above a predetermined minimum level, and modulating means modulating the output voltage of said source so that for a first predetermined time the voltage of said source has a magnitude which causes each elemental electroluminescent portion to build up towards its saturation brightness for incident radiation on its corresponding elemental photoconductive portion above said predetermined minimum level, and for a second predetermined time which causes each elemental electroluminescent portion to become substantially dark, said first predetermined time being chosen substantially equal to the time taken for said electroluminescent element to build up to its saturation brightness level when said photoconductive element is illuminated by said predetermined level of incident radiation, and said second predetermined time being chosen less than the non-regenerative decay time of the electroluminescent and photoconductive circuit by an amount which will cause the last image on the electroluminescent lamina to be retained after the incident image is removed.

References Cited in the file of this patent

UNITED STATES PATENTS

| | | |
|---|---|---|
| 2,896,087 | Kazan | July 21, 1959 |
| 2,916,630 | Rosenberg | Dec. 8, 1959 |
| 2,931,915 | Jay | Apr. 5, 1960 |